(12) United States Patent
Tsai et al.

(10) Patent No.: US 11,770,637 B2
(45) Date of Patent: Sep. 26, 2023

(54) SENSING DEVICE

(71) Applicant: InnoLux Corporation, Miao-Li County (TW)

(72) Inventors: Ya-Li Tsai, Miao-Li County (TW); Tao-Sheng Chang, Miao-Li County (TW); Hui-Ching Yang, Miao-Li County (TW); Te-Yu Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/688,172

(22) Filed: Mar. 7, 2022

(65) Prior Publication Data

US 2022/0321821 A1  Oct. 6, 2022

(30) Foreign Application Priority Data

Apr. 6, 2021  (CN) .......................... 202110368311.3

(51) Int. Cl.
*H04N 25/767* (2023.01)
*G06V 40/13* (2022.01)
*H04N 25/701* (2023.01)
*H04N 25/766* (2023.01)
*H04N 25/771* (2023.01)

(52) U.S. Cl.
CPC .......... *H04N 25/767* (2023.01); *G06V 40/13* (2022.01); *H04N 25/701* (2023.01); *H04N 25/766* (2023.01); *H04N 25/771* (2023.01)

(58) Field of Classification Search
CPC .. H04N 25/767; H04N 25/701; H04N 25/766; H04N 25/771; G06V 40/13
See application file for complete search history.

(56) References Cited

U.S. PATENT DOCUMENTS

| 4,277,799 | A | 7/1981 | Koike et al. |
| 9,214,490 | B2 | 12/2015 | Yamaoka |
| 11,172,153 | B2 | 11/2021 | Oh et al. |
| 11,610,424 | B2 * | 3/2023 | Kim ....................... H04N 25/46 |

(Continued)

FOREIGN PATENT DOCUMENTS

| CN | 111027498 A | 4/2020 |
| JP | H11-266399 A | 9/1999 |

(Continued)

OTHER PUBLICATIONS

Partial European Search Report dated Aug. 22, 2022, issued in application No. EP 22161606.3.

(Continued)

*Primary Examiner* — Michael E Teitelbaum
(74) *Attorney, Agent, or Firm* — McClure, Qualey & Rodack, LLP (57) ABSTRACT

A sensing device, including a plurality of sensing pixels arranged in Y rows and M columns, a plurality of readout lines coupled to the sensing pixels, and a plurality of control lines each coupled to a sensing pixel subset, is provided. The Y times N sensing pixels within the sensing pixel subset are arranged in adjacent N columns, where Y, M and N are integers and N is smaller than M. Each of the control lines is configured to control one row of the sensing pixel subset to output signals through corresponding readout lines.

17 Claims, 9 Drawing Sheets

(56) References Cited

U.S. PATENT DOCUMENTS

| | | | |
|---|---|---|---|
| 2003/0011829 A1* | 1/2003 | Dierickx | H04N 25/767 |
| | | | 348/E3.018 |
| 2003/0179304 A1 | 9/2003 | Kuroda et al. | |
| 2009/0207293 A1 | 8/2009 | Ryoki et al. | |
| 2010/0026814 A1 | 2/2010 | Shimoda | |
| 2018/0019273 A1* | 1/2018 | Leon-Salas | H01L 27/14643 |
| 2018/0124337 A1 | 5/2018 | Kim | |

FOREIGN PATENT DOCUMENTS

| | | |
|---|---|---|
| TW | 201509187 A | 3/2015 |
| TW | 201834448 A | 9/2018 |
| TW | 202009911 A | 3/2020 |

OTHER PUBLICATIONS

Chinese language office action dated Aug. 29, 2022, issued in application No. TW 111110517.
Extended European Search Report dated Dec. 15, 2022, issued in application No. EP 22161606.3.

* cited by examiner

SENSING DEVICE

CROSS REFERENCE TO RELATED APPLICATIONS

This application claims priority of China Patent Application No. 202110368311.3, filed on Apr. 6, 2021, the entirety of which is incorporated by reference herein.

BACKGROUND OF THE INVENTION

Field of the Invention

The present disclosure relates to a sensing device, and, in particular, to an image sensor.

Description of the Related Art

Traditional image sensors send data to back-end systems sequentially for processing, and read out the data of the entire screen using multiplexers. For example, for tricolor data with red (R), green (G) and blue (B) colors, the data is sequentially written into pixels in the sequence of, for example, R-G-B. Thus, if a physically large image sensor without a multiplexer circuit attempts to read out the data completely, it is required to use multiple integrated circuits (IC) in the back-end system, which is disadvantageous in terms of cost and efficiency. However, a multiplexer circuit fabricated with traditional design methods requires a relatively long time to finish the data processing operations, which is disadvantageous in providing desirable user experience.

Traditionally, the design of multiplexer circuits directly affects the length of the bottom border of the image sensor. The higher the resolution of the image sensor is, the more traces are required in the multiplexers, leading to a greater length of the bottom border. It is important to design the borders properly to integrate the image sensor into products such as smartphones. A shortened bottom border is advantageous for product diversification.

BRIEF SUMMARY OF THE INVENTION

An embodiment of the present disclosure provides a sensing device, including a plurality of sensing pixels arranged in Y rows and M columns, a plurality of readout lines coupled to the sensing pixels, and a plurality of control lines each coupled to a sensing pixel subset. The Y times N sensing pixels within the sensing pixel subset are arranged in adjacent N columns, where Y, M and N are integers and N is smaller than M. Each of the control lines is configured to control one row in the sensing pixel subset to output signals through corresponding readout lines.

BRIEF DESCRIPTION OF THE DRAWINGS

The present disclosure may be more fully understood by reading the subsequent detailed description and examples with references made to the accompanying drawings. Same numerals within different Figures represent same or similar components.

DETAILED DESCRIPTION OF THE INVENTION

Figure 1:
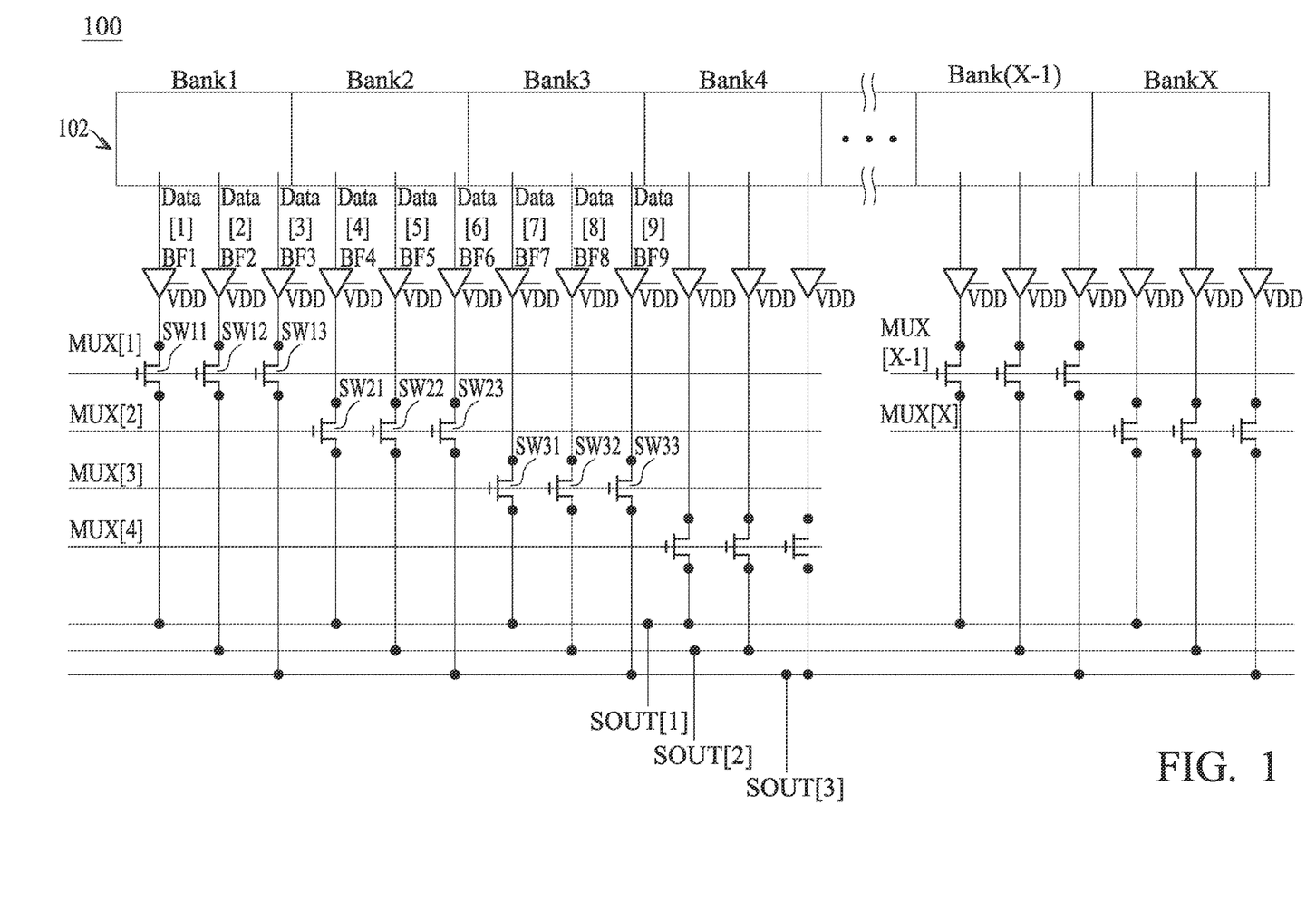
FIG. 1 shows a schematic diagram of an exemplary sensing device.

FIG. 1 shows an exemplary embodiment of a sensing device 100 according to the present disclosure. In an exemplary embodiment of the present disclosure, the sensing device 100 is, but not limited to, a fingerprint-sensing device. In other embodiments, the sensing device 100 may include a face-sensing device, a palm print sensing device, an iris-sensing device, a retina-sensing device, or any other suitable biological feature-sensing device. In the embodiment, the sensing device 100 has a sensing area 102, including a plurality of sensing pixels (not shown) arranged in Y rows and M columns, wherein Y and M are positive integers. Each row of sensing pixels is controlled by an enable signal (not shown). The sensing area 102 may be divided into X banks, Bank1 to Bank(X), each bank being a sensing pixel in the sensing pixel subset, wherein X is a positive integer. Each bank includes N adjacent columns of sensing pixels, wherein N is a positive integer smaller than M. Thus, the total number of columns M of sensing pixels within the sensing area 102 equals the product of the number of columns within a bank and the number of banks:

$$M = X*N$$

and the total number of sensing pixels Z equals the product of the number of rows and the total number of columns:

$$Z = Y*M = Y*X*N$$

Each bank in Bank1 to Bank(X) includes a sensing pixel subset, the sensing pixel subset has Y*N sensing pixels arranged in the adjacent N columns.

Each bank in Bank1 to Bank(X) has readout lines; each sensing pixel in a single column couples to a readout line corresponding to the column. In this example (e.g. N=3), the bank Bank1 has three adjacent readout lines Data[1], Data[2] and Data[3], the bank Bank2 has three adjacent readout lines Data[4], Data[5] and Data[6], and the bank Bank3 has three adjacent readout lines Data[7], Data[8] and Data[9], and so on. In addition, the sensing device 100 further includes a plurality of buffer circuits, e.g. BF1 to BF9; each readout line couples to a respective corresponding buffer circuit (e.g. including a buffer amplifier). The voltage source terminal of each of the buffer circuits (e.g. BF1 to BF9) is coupled to a voltage source VDD. The buffer circuits coupled to the readout lines within a single bank are adjacent to each other as well, and these buffer circuits form a buffer circuit subset. For example, the buffer circuits BF1, BF2 and BF3 coupled to the readout lines Data[1], Data[2] and Data[3] of the bank Bank1 are adjacent to each other and form a buffer circuit subset. Each readout line includes a front part that is coupled to the input terminal of a buffer circuit and a rear part that is coupled to the output terminal of the buffer circuit.

The sensing device 100 further includes control lines, e.g. MUX[ ] to MUX[4], MUX[X−1] and MUX[X]. Each of the control lines MUX[ ] to MUX[X] is coupled to a respective bank of the readout pixels. The rear part of the readout lines are coupled to the control lines with switches. That is, the switches are coupled between each of the control lines MUX[ ] to MUX[X] and each of the buffer circuits within the buffer circuit subset corresponding to the control line. In this example, the switches may be metal-oxide-semiconductor field-effect transistors (MOSFETs), bipolar junction transistors (BJTs), or the like. The three readout lines of the bank Bank1 (Data[1], Data[2] and Data[3]) are coupled to the first control line MUX[ ] by switches SW11, SW12 and SW13 respectively, the three readout lines of the bank Bank2 (Data[4], Data[5] and Data[6]) are coupled to the second control line MUX[ ] by switches SW21, SW22 and SW23 respectively, and the three readout lines of the bank Bank3 (Data[7], Data[8] and Data[9]) are coupled to the third control line MUX[ ] by switches SW31, SW32 and SW33 respectively, and so on. Each of the control lines MUX[ ] to MUX[X] is configured to control a row of enabled sensing pixels in a corresponding bank of the sensing area 102 to output signals through corresponding readout lines. For example, the control line MUX[ ] controls a row of enabled sensing pixels in the bank Bank1 to output signals through three readout lines Data[1], Data[2] and Data[3], the control line MUX[ ] controls a row of enabled sensing pixels in the bank Bank2 to output signals through three readout lines Data[4], Data[5] and Data[6], and so on. When reading data of a certain row in a certain bank (e.g. Bank1), the row is enabled and the corresponding switches (e.g. SW11, SW12 and SW13) are turned on by the control line (e.g. MUX[ ]) corresponding to the bank, so as to output the data of the row through corresponding readout lines.

The sensing device 100 further includes a plurality of output lines, e.g. SOUT[1], SOUT[2] and SOUT[3] in this example. In this embodiment, the number of output lines is N, which is the number of columns of sensing pixels within each bank. Each bank includes three columns of sensing pixels, thus the number of output lines is three as well; however, in other implementations, the number of output lines may not be equal to the number of columns of sensing pixels within each bank. In banks Bank1 to Bank(X), the readout lines of each bank further output the sensing signals to the output lines through corresponding switches. For example, the readout lines Data[1], Data[2] and Data[3] of the bank Bank1 output the sensing signals to the output lines SOUT[1], SOUT[2] and SOUT[3] through the switches SW11, SW12 and SW13 controlled by the control line MUX[1]; the readout lines Data[4], Data[5] and Data[6] of the bank Bank2 output the sensing signals to the output lines SOUT[1], SOUT[2] and SOUT[3] through the switches SW21, SW22 and SW23 controlled by the control line MUX[2], and so on. The sensing device 100 further includes a processor (not shown) configured to receive signals from the output lines SOUT[1], SOUT[2] and SOUT[3]. The processor may be, for example, an integrated circuit configured to recognize fingerprints after analyzing the signals.

Figure 2:
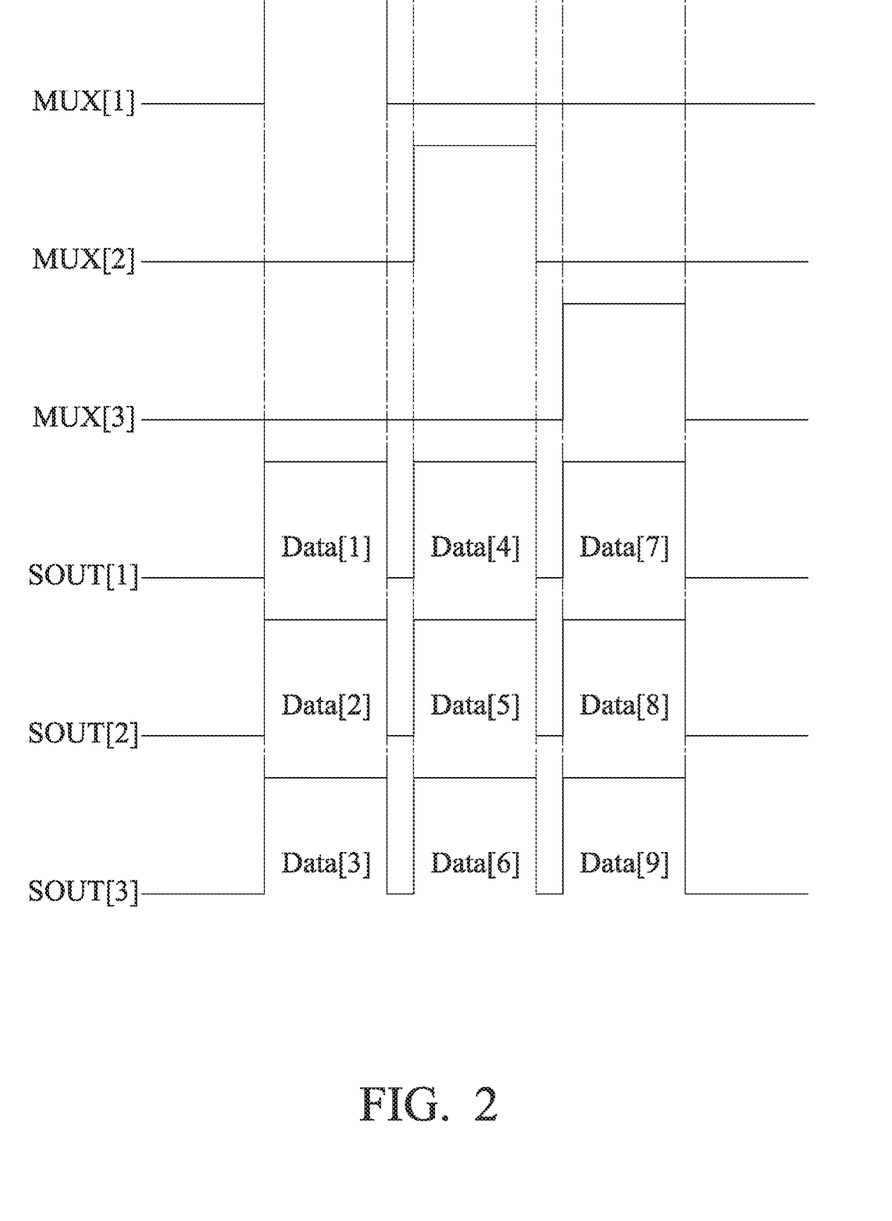
FIG. 2 shows a timing diagram illustrating the signal output of the sensing device shown in FIG. 1 when different control lines are enabled.

FIG. 2 shows a timing diagram illustrating the signal output of the sensing device 100 shown in FIG. 1 when different control lines are enabled. Referring to FIG. 1, in a time period, when applying a control signal to the control line MUX[1] and not applying to other control lines, the switches SW11, SW12 and SW13 are turned on, so as to allow the sensing signals or data (i.e. the data in the readout lines Data[1], Data[2] and Data[3]) in a row of enabled sensing pixels in the bank Bank1 to be output to the output lines SOUT[1], SOUT[2] and SOUT[3]. In another time period, when applying a control signal to the control line MUX[2] and not applying to other control lines, the switches SW21, SW22 and SW23 are turned on, so as to allow the sensing signals or data (i.e. the data in the readout lines Data[4], Data[5] and Data[6]) in a row of enabled sensing pixels in the bank Bank2 to be output to the output lines SOUT[1], SOUT[2] and SOUT[3]. In yet another time period, when applying a control signal to the control line MUX[3] and not applying to other control lines, the switches SW31, SW32 and SW33 are turned on, so as to allow the sensing signals or data (i.e. the data in the readout lines Data[7], Data[8] and Data[9]) in a row of enabled sensing pixels in the bank Bank3 to be output to the output lines SOUT[1], SOUT[2] and SOUT[3]. It may be understood from FIG. 2 that the configuration shown in FIG. 1 allows the operation of reading out the signals in a single bank instead of reading the signals in all of the banks Bank1 to Bank(X) in the entire sensing area 102; moreover, all the signals within any of the banks may be read out simultaneously instead of sequentially. This feature may substantially reduce the readout time of the sensing device and improve user experience.

Figure 3:
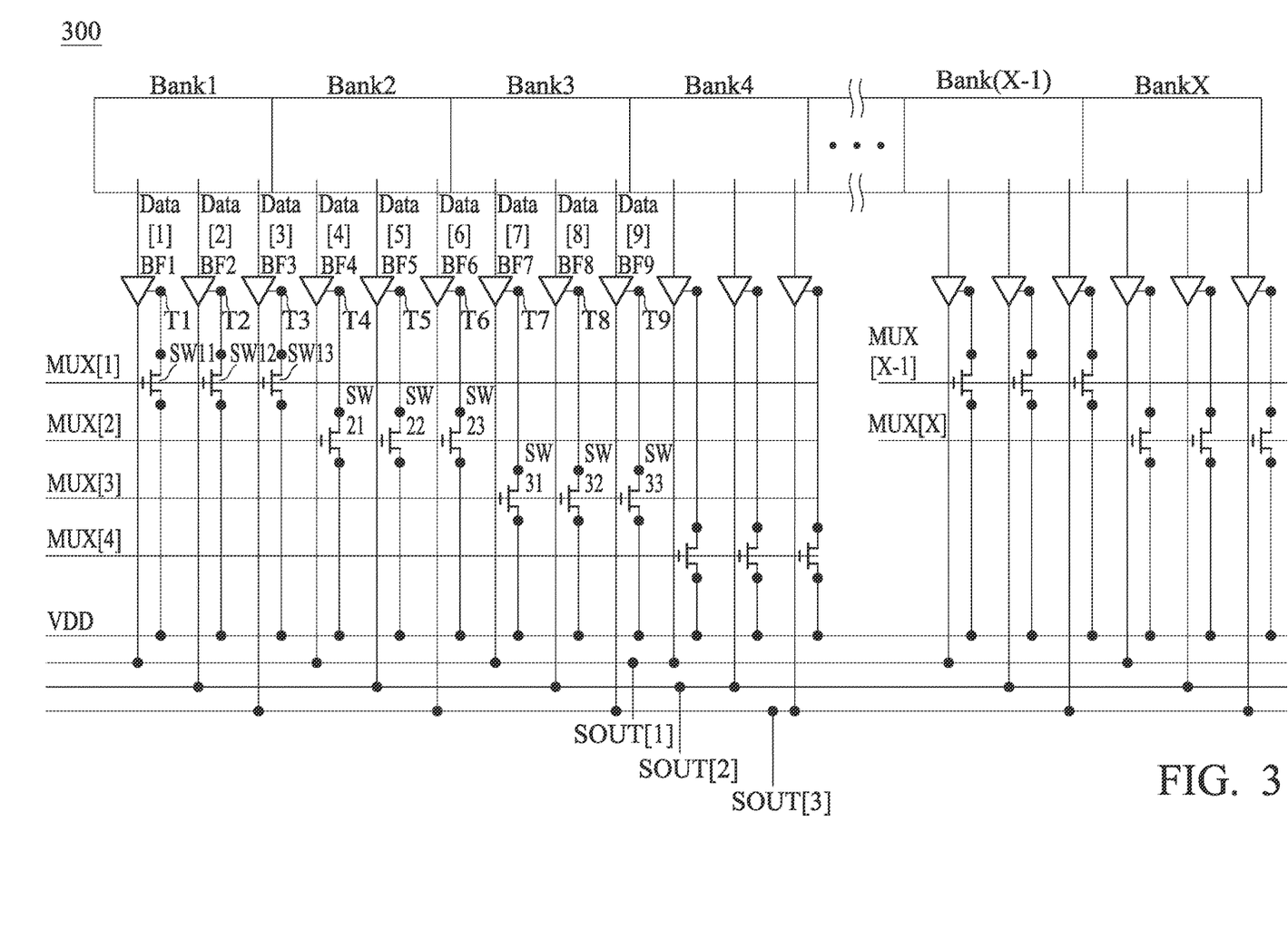
FIG. 3 shows a schematic diagram of another exemplary sensing device.

FIG. 3 shows the exemplary diagram of another embodiment of a sensing device 300 according to the present disclosure. The difference between the banks and their corresponding circuit structure of the sensing device 300 shown in FIG. 3 and those of the sensing device 100 shown in FIG. 1 is discussed below. Referring to FIG. 3, the readout lines Data[1], Data[2] and Data[3] of the bank Bank1 of the sensing device 300 are coupled to the output lines SOUT[1], SOUT[2] and SOUT[3] through the buffer circuits BF1, BF2 and BF3 respectively; each switch SW11, SW12 and SW13 controlled by the control line MUX[1] is respectively coupled between the voltage source terminal T1, T2 and T3 of the corresponding buffer circuit BF1, BF2 and BF3 and a voltage source VDD. Similarly, the readout lines Data[4], Data[5] and Data[6] of the bank Bank2 of the sensing device 300 are coupled to the output lines SOUT[1], SOUT[2] and SOUT[3] through the buffer circuits BF4, BF5 and BF6 respectively; each switch SW21, SW22 and SW23 controlled by the control line MUX[2] is respectively coupled between the voltage source terminal T4, T5 and T6 of the corresponding buffer circuit BF4, BF5 and BF6 and the voltage source VDD. The corresponding circuits of the remaining banks in FIG. 3 have similar structures with that of banks Bank1 and Bank2. In this example, the switches are not directly arranged at the output terminal of the buffer amplifiers to control whether the signals are allowed to be output; instead, the switches are arranged at the voltage source terminal of the buffer amplifiers to control the power supply of the buffer amplifiers, so as to determine whether the signals are allowed to arrive at the output lines through the buffer amplifiers. This exemplary configuration may achieve an effect similar to the configuration shown in FIG. 1.

Figure 4A:
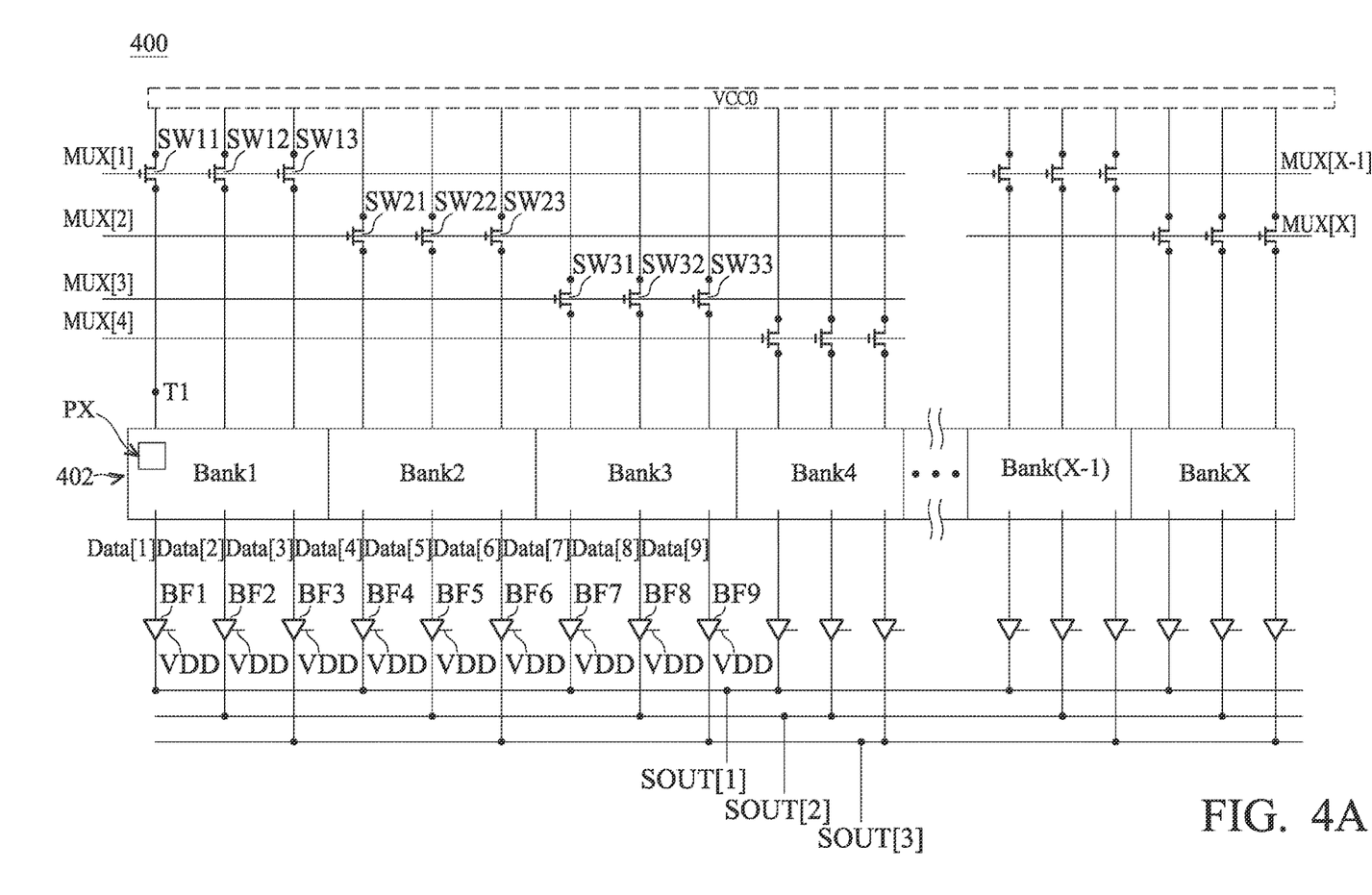
FIG. 4A shows a schematic diagram of yet another exemplary sensing device.

FIG. 4A shows yet another exemplary embodiment of a sensing device 400 according to the present disclosure. The sensing device 400 includes a plurality of control lines MUX[1] to MUX[X], a plurality of buffer circuits (e.g. BF1 to BF9), output lines SOUT[1], SOUT[2] and SOUT[3], and a sensing area 402. The sensing area 402 is arranged between the plurality of control lines MUX[1] to MUX[X] and the buffer circuits (e.g. BF1 to BF9). The sensing area 402 is divided into X banks Bank1 to Bank(X). Each column within a single bank is coupled to a single control line through its respective switch. For example (e.g. N=3), in the bank Bank1, each of the columns that the readout lines Data[1], Data[2] and Data[3] are located in corresponds to a respective switch, and the three switches (SW11, SW12 and SW13) are coupled to a single control line MUX[1].

Figure 4B:
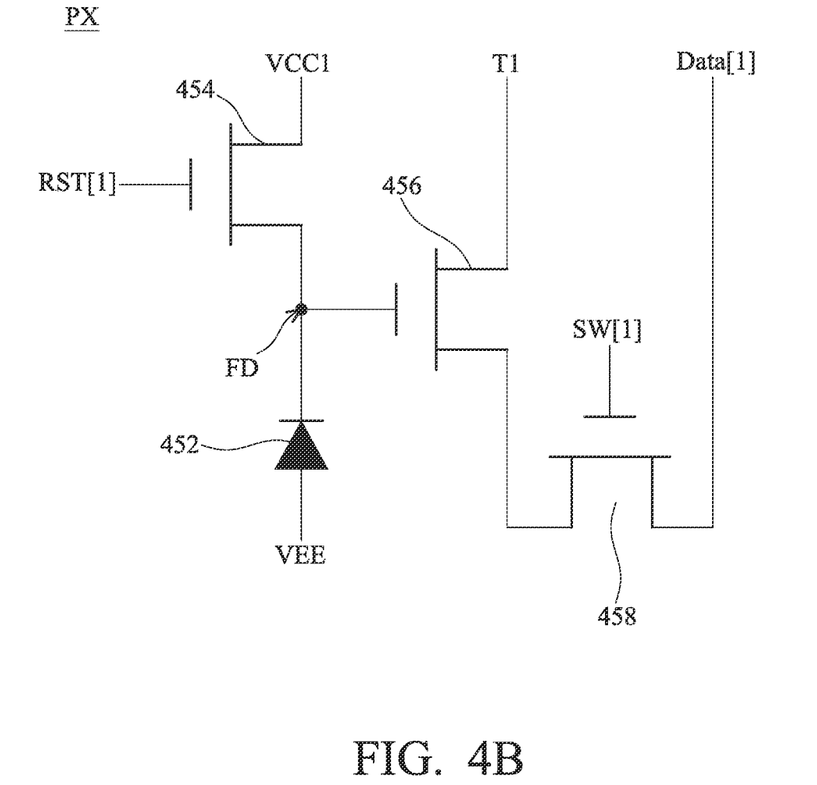
FIG. 4B shows a schematic diagram of an exemplary sensing pixel.

The sensing area 402 includes a plurality of sensing pixels arranged in an array. FIG. 4B shows a schematic circuit diagram of a non-limiting exemplary sensing pixel PX. For example, a sensing pixel PX on the readout line Data[1] includes a first transistor (e.g. a MOSFET) 454, a photosensitive element (e.g. a photodiode) 452, a second transistor (e.g. a MOSFET) 456, and a switch transistor (e.g. a MOSFET) 458. The first transistor 454 and the photosensitive element 452 are arranged between a first voltage VCC1 and a second voltage VEE. In a reset period, the control signal RST[1] is enabled, the first transistor 454 is turned on, and the first voltage VCC1 is written into the node FD where the photosensitive element 452 is coupled to the second transistor 456. In a sensing period, the first transistor 454 is turned off, and the photosensitive element 452 is exposed to light and generates a photocurrent to change the voltage at the node FD. The second transistor 456 serves as a source follower and is coupled to the voltage source terminal T1. In a readout period, the control signal SW[1] is enabled, the switch transistor 458 is turned on, and the sensing signal or data associated with the voltage of the node FD is output to the readout line (e.g. Data[1]). Here, the sensing pixels within the same row are enabled to output sensing signals. In addition, the readout lines of each bank, e.g. the readout lines Data[1] to Data[9] of banks Bank1 to Bank3, are coupled to the output lines SOUT[1], SOUT[2] and SOUT[3] respectively through buffer circuits. The voltage source terminal T1 of the sensing pixels PX within each column of each bank is coupled to the voltage source VCC0 through a respective switch controlled by one of the control lines MUX[1] to MUX[X]. Thus, for example, for the bank Bank1, when the control line MUX[1] is enabled and the corresponding switches SW11, SW12 and SW13 are turned on, the sensing pixels PX in the sensing area 402 of FIG. 4A coupled to the switches SW11, SW12 and SW13 are provided with the voltage VCC0 and are allowed to perform the operations of data readout.

The exemplary configuration shown in FIGS. 4A and 4B may achieve an effect similar to the configuration shown in FIG. 1. In addition, the control circuits (including X control lines MUX[1] to MUX[X] and M switches SW11 to SW13, SW21 to SW23, etc.) are located above the sensing pixels, allowing a modification of the circuit layout shown in FIGS. 1 and 3 from concentrating at the bottom border to dispersing at the top and bottom borders, which is advantageous for product diversification.

Figure 5:
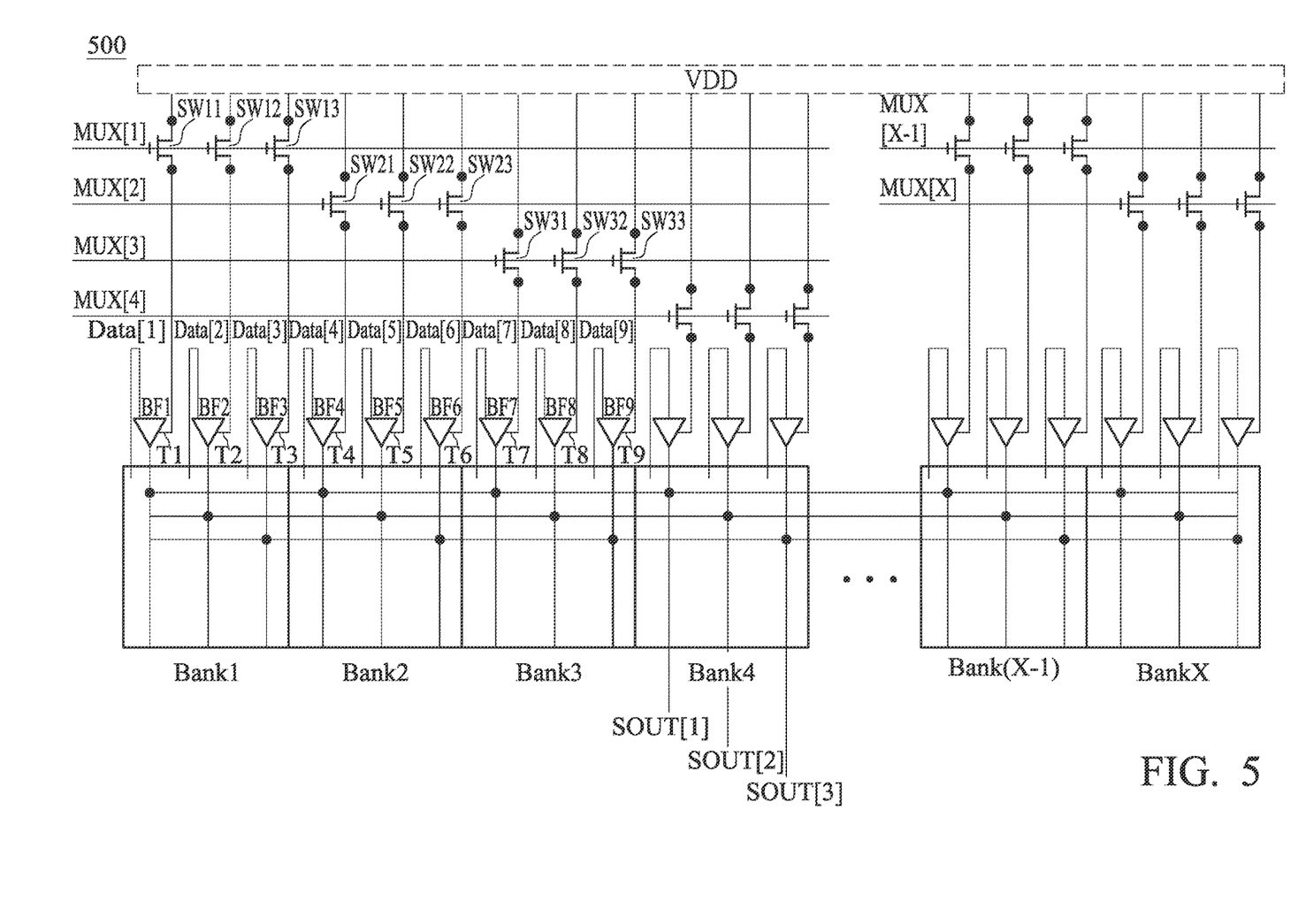
FIG. 5 shows a schematic diagram of yet another exemplary sensing device.

FIG. 5 shows yet another exemplary embodiment of a sensing device 500 according to the present disclosure. The difference between the banks and their corresponding circuit structure of the sensing device 500 shown in FIG. 5 and those of the sensing device 300 shown in FIG. 3 is discussed below. Referring to FIG. 5, the readout lines Data[1], Data[2] and Data[3] in the bank Bank1 of the sensing device 500 are coupled to the output lines SOUT[1], SOUT[2] and SOUT[3] through the buffer circuits BF1, BF2 and BF3 respectively. Each switch SW11, SW12 and SW13 controlled by the control line MUX[1] is coupled between a voltage source VDD and the voltage source terminals T1, T2 and T3 of the corresponding buffer circuits BF1, BF2 and BF3 respectively. Similarly, the readout lines Data[4], Data[5] and Data[6] in the bank Bank2 of the sensing device 500 are coupled to the output lines SOUT[1], SOUT[2] and SOUT[3] through the buffer circuits BF4, BF5 and BF6 respectively. Each switch SW21, SW22 and SW23 controlled by the control line MUX[2] is coupled between the voltage source VDD and the voltage source terminals T4, T5 and T6 of the corresponding buffer circuits BF4, BF5 and BF6 respectively. The corresponding circuits of the remaining banks in FIG. 5 have similar structures with that of banks Bank1 and Bank2. In this example, the control circuits (including X control lines MUX[1] to MUX[X] and M switches SW11 to SW13, SW21 to SW23, etc.) are located above the sensing pixels, allowing a modification of the circuit layout shown in FIG. 3 from concentrating at the bottom border to dispersing at the top and bottom borders. In addition, the coupling nodes of the readout lines Data[1] to Data[9] and the output lines SOUT[1] to SOUT[3] are arranged within the element area where the sensing pixels are formed. Such configuration may shorten the length of the bottom border, which is advantageous for product diversification.

Figure 6:
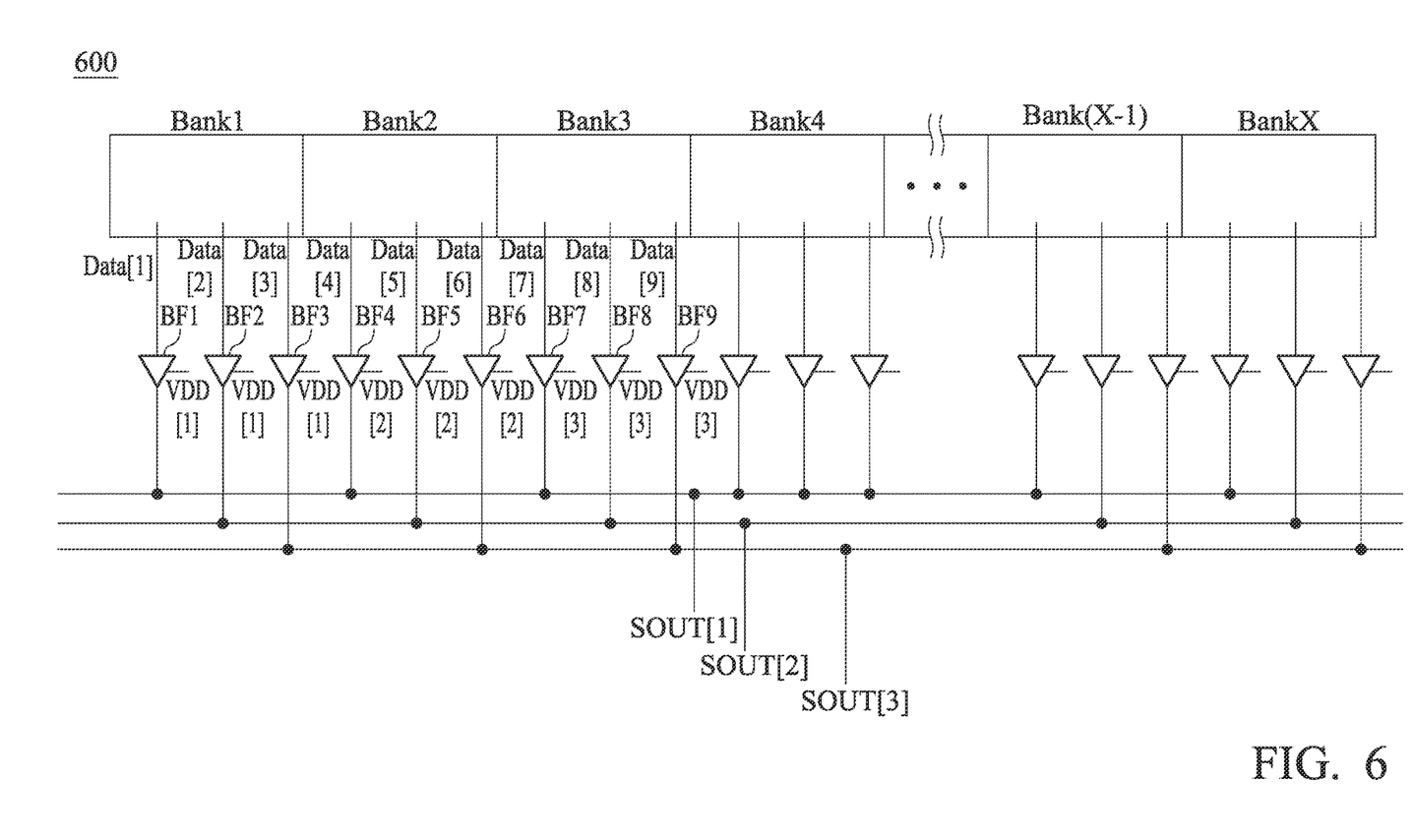
FIG. 6 shows a schematic diagram of yet another exemplary sensing device.

FIG. 6 shows yet another exemplary embodiment of a sensing device 600 according to the present disclosure. The difference between the banks and their corresponding circuit structure of the sensing device 600 shown in FIG. 6 and those of the sensing device 300 shown in FIG. 3 is discussed below. Referring to FIG. 6, the readout lines Data[1], Data[2] and Data[3] in the bank Bank1 of the sensing device 600 are coupled to the output lines SOUT[1], SOUT[2] and SOUT[3] through the buffer circuits BF1, BF2 and BF3 respectively. The voltage source terminals of the buffer circuits BF1, BF2 and BF3 are coupled to a control signal VDD[1] to control the power supply of the buffer circuits BF1, BF2 and BF3. Similarly, the readout lines Data[4], Data[5] and Data[6] in the bank Bank2 of the sensing device 600 are coupled to the output lines SOUT[1], SOUT[2] and SOUT[3] through the buffer circuits BF4, BF5 and BF6 respectively. The voltage source terminals of the buffer circuits BF4, BF5 and BF6 are coupled to a control signal VDD[2] to control the power supply of the buffer circuits BF4, BF5 and BF6. The corresponding circuits of the remaining banks in FIG. 6 have similar structures with that of banks Bank1 and Bank2. In this embodiment, through the controlling of the control signals VDD[1], VDD[2], etc., the sensing device 600 may selectively output the signals or data in the banks Bank1 to Bank(X) through the output lines SOUT[1], SOUT[2] and SOUT[3] respectively.

Figure 7:
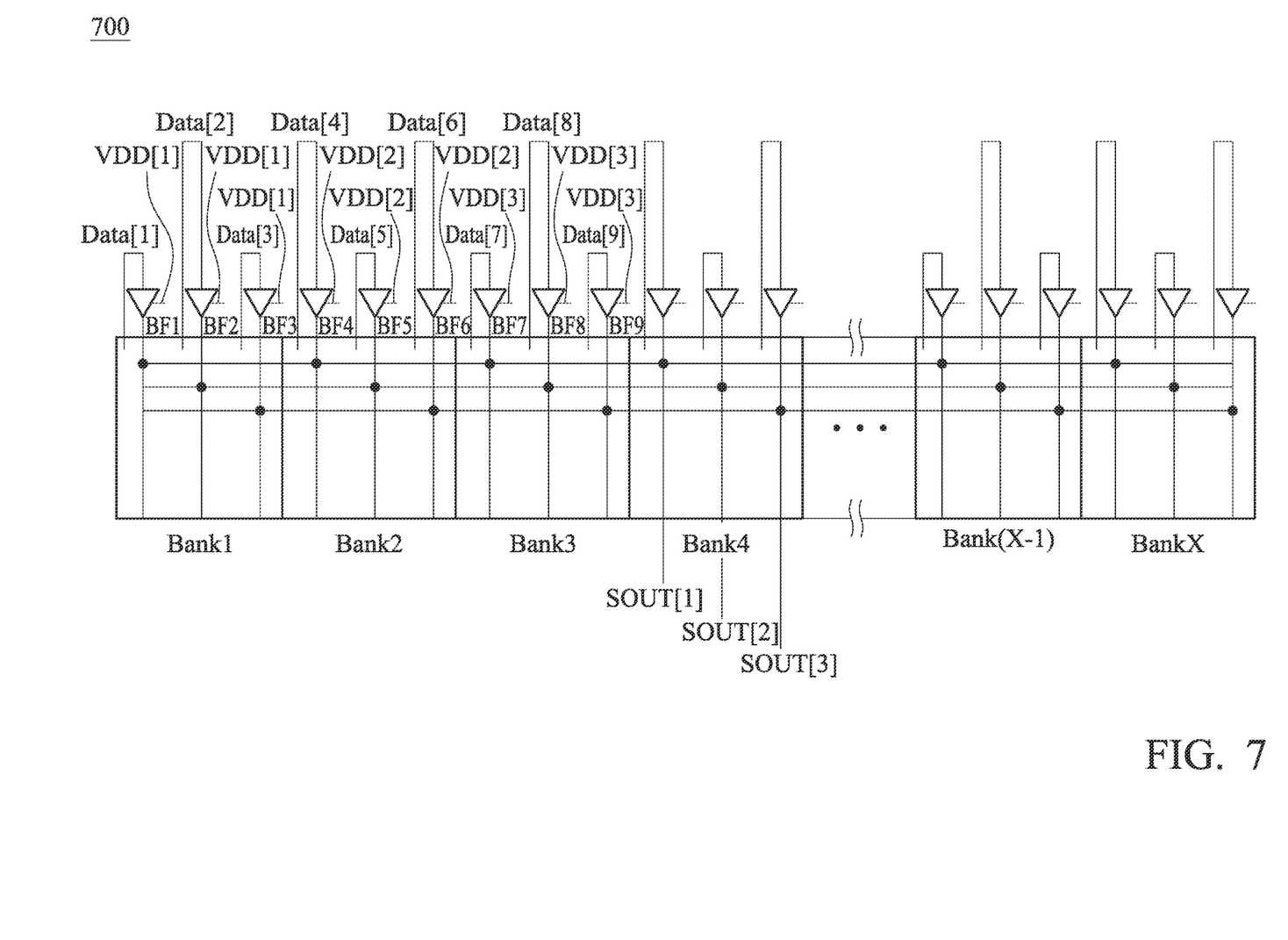
FIG. 7 shows a schematic diagram of yet another exemplary sensing device.

FIG. 7 shows yet another exemplary embodiment of a sensing device 700 according to the present disclosure. The difference between the banks and their corresponding circuit structure of the sensing device 700 shown in FIG. 7 and those of the sensing device 600 shown in FIG. 6 is discussed below. Referring to FIG. 7, the readout lines Data[1], Data[2] and Data[3] in the bank Bank1 of the sensing device 700 are coupled to the output lines SOUT[1], SOUT[2] and SOUT[3] through the buffer circuits BF1, BF2 and BF3 respectively. The voltage source terminals of the buffer circuits BF1, BF2 and BF3 are coupled to a control signal VDD[1] to control the power supply of the buffer circuits BF1, BF2 and BF3. Similarly, the readout lines Data[4], Data[5] and Data[6] in the bank Bank2 of the sensing device 700 are coupled to the output lines SOUT[1], SOUT[2] and SOUT[3] through the buffer circuits BF4, BF5 and BF6 respectively. The voltage source terminals of the buffer circuits BF4, BF5 and BF6 are coupled to a control signal VDD[2] to control the power supply of the buffer circuits BF4, BF5 and BF6. The corresponding circuits of the remaining banks in FIG. 7 have similar structures with that of banks Bank1 and Bank2. In this example, the buffer circuits are located above the sensing pixels, allowing a modification of the circuit layout shown in FIG. 6 from concentrating at the bottom border to dispersing at the top and bottom borders. In addition, the coupling nodes of the readout lines Data[1] to Data[9] and the output lines SOUT [1] to SOUT[3] are arranged within the element area where the sensing pixels are formed. Such configuration may shorten the length of the bottom border, which is advantageous for product diversification.

Figure 8:
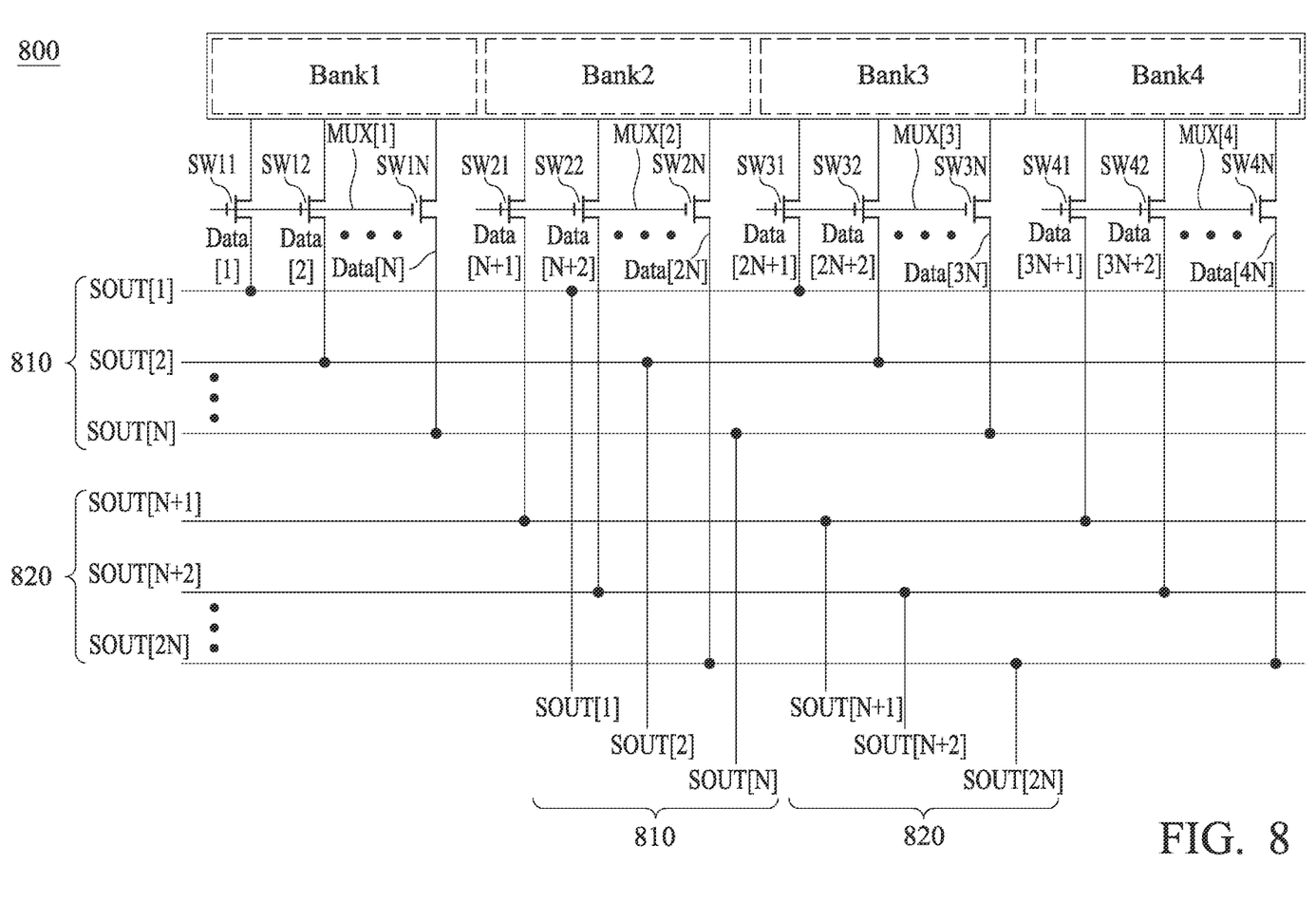
FIG. 8 shows a schematic diagram of yet another exemplary sensing device.

FIG. 8 shows yet another exemplary embodiment of a sensing device 800 according to the present disclosure. For brevity, in this embodiment, the sensing device 800 is illustrated as having four banks Bank1 to Bank4, wherein each bank has a plurality of sensing pixels arranging in N columns. Referring to FIG. 8, the control line MUX[1] of the sensing device 800 is coupled to the readout lines Data[1] to Data[N] in the bank Bank1. The readout lines Data[1] to Data[N] in the bank Bank1 are coupled to the output lines SOUT[1] to SOUT[N] respectively. The control line MUX [2] of the sensing device 800 is coupled to the readout lines Data[N+1] to Data[2N] in the bank Bank2. The readout lines Data[N+1] to Data[2N] in the bank Bank2 are coupled to the output lines SOUT[N+1] to SOUT[2N] respectively. The control line MUX[3] of the sensing device 800 is coupled to the readout lines Data[2N+1] to Data[3N] in the bank Bank3. The readout lines Data[2N+1] to Data[3N] in the bank Bank3 are coupled to the output lines SOUT[ ] to SOUT[N] respectively. The control line MUX[4] of the sensing device 800 is coupled to the readout lines Data[3N+ 1] to Data[4N] in the bank Bank4. The readout lines Data[3N+1] to Data[4N] in the bank Bank4 are coupled to the output lines SOUT[N+1] to SOUT[2N] respectively, and so on. For brevity and clarity, the buffer circuit corresponding to each readout line is omitted. The output lines SOUT[ ] to SOUT[N] are collectively named as the output line set 810 and are coupled to the control lines MUX[1] and MUX[3]. The output lines SOUT[N+1] to SOUT[2N] are collectively named as the output line set 820 and are coupled to the control lines MUX[2] and MUX[4].

For example, to read out banks Bank1 and Bank2, the corresponding control signals MUX[1] and MUX[2] of the two banks are enabled; at this time, the signals in the readout lines Data[1] to Data[N] of Bank1 are output through the output lines SOUT[ ] to SOUT[N], and the signals in the readout lines Data[N+1] to Data[2N] of Bank2 are output through the output lines SOUT[N+1] to SOUT[2N]. To read out banks Bank2 and Bank3, the corresponding control signals MUX[2] and MUX[3] of the two banks are enabled; at this time, the signals in the readout lines Data[N+1] to Data[2N] of Bank2 are output through the output lines SOUT[N+1] to SOUT[2N], and the signals in the readout lines Data[2N+1] to Data[3N] of Bank3 are output through the output lines SOUT[ ] to SOUT [N], and so on.

The output line sets 810 and 820 are used in the sensing device 800, and the banks Bank1, Bank3, etc. are coupled to the output line set 810 while the banks Bank2, Bank4, etc. are coupled to the output line set 820. Such configuration allows any two adjacent banks to use different output line sets, so as to output the signals in the two adjacent banks simultaneously.

The term "coupling" may be a direct or indirect connection. The term "two elements are coupled" may refer to a direct contact transmitting electric signals and that no other elements are located between the two elements. Alternatively, the coupled elements may transmit electric signals through one or more elements serving as an intermediate bridge between them.

The terms "first," "second," "third" and the like may be used to describe various components; however, the components are not limited thereto. The terms are merely used to distinguish a single component from the others in the Specification. In the Claims, such terms may not be used and may be replaced with the "first," "second," "third," etc. according to the declaring sequence of the elements in the claims. Thus, a "first" component in the Specification may be a "second" component in the Claims.

It is to be understood that a person skilled in the art may make alternatives, modifications and combinations of various aforementioned embodiments to achieve other embodiments without departing the spirit and scope of the present disclosure.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising." Equivalent alterations and modifications that do not depart from the spirit and scope of the present disclosure will occur or be known to others skilled in the art upon the reading and understanding of this specification and the annexed drawings. Features disclosed in various embodiments may be used in any form of combination under the premise of not departing the spirit and scope of the present disclosure.

What is claimed is:

1. A sensing device, comprising:
   a plurality of sensing pixels, arranged in Y rows and M columns;
   a plurality of readout lines coupled to the sensing pixels;
   a plurality of control lines, wherein each of the control lines is coupled to a sensing pixel subset, and the sensing pixel subset has Y*N sensing pixels arranged in adjacent N columns, wherein Y, M and N are positive integers and N is smaller than M;
   a plurality of buffer circuits coupled to the respective readout lines, wherein each of the control lines is coupled to a different buffer circuit subset of buffer circuits, and the buffer circuits within each of the buffer circuit subsets are adjacent to each other; and
   a plurality of switches coupled between each of the control lines and each buffer circuit within the buffer circuit subset corresponding to the control line;
   wherein each of the control lines is configured to control a row of sensing pixels within the sensing pixel subset to output signals through corresponding readout lines.

2. The sensing device as claimed in claim 1, wherein the control lines include a first control line and a second control line, the first control line and the second control line are configured to control a row of sensing pixels within different sensing pixel subsets to output signals through the corresponding readout lines in different time periods.

3. The sensing device as claimed in claim 1, further comprising a plurality of output lines coupled to the readout lines, and wherein the number of output lines is equal to N.

4. The sensing device as claimed in claim 3, further comprising a processor configured to receive signals from the output lines.

5. The sensing device as claimed in claim 1, wherein sensing pixels are arranged between the control lines and the buffer circuits.

6. The sensing device as claimed in claim 1, wherein each of the sensing pixels includes a source follower, and each of the control lines is coupled to the respective source followers of the sensing pixels arranged in adjacent N columns.

7. A sensing device, comprising:
a plurality of sensing pixels, arranged in Y rows and M columns;
a plurality of readout lines coupled to the sensing pixels;
a plurality of control lines, wherein each of the control lines is coupled to a sensing pixel subset, and the sensing pixel subset has Y*N sensing pixels arranged in adjacent N columns, wherein Y, M and N are positive integers and N is smaller than M;
a first output line set and a second output line set;
wherein each of the control lines is configured to control a row of sensing pixels within the sensing pixel subset to output signals through corresponding readout lines;
wherein the control lines include a first control line and a second control line coupled to the first output line set and the second output line set respectively.

8. The sensing device as claimed in claim 1, further comprising a plurality of output lines coupled to the readout lines, wherein the coupling nodes of the output lines and the readout lines are arranged within an element area where the sensing pixels are formed.

9. A sensing device, comprising:
a plurality of sensing pixels, arranged in Y rows and M columns;
a plurality of readout lines coupled to the sensing pixels;
a plurality of control signals, wherein each of the control signals is coupled to a sensing pixel subset, and the sensing pixel subset has Y*N sensing pixels arranged in adjacent N columns, wherein Y, M and N are positive integers and N is smaller than M;
a plurality of output lines coupled to the readout lines, wherein the coupling nodes of the output lines and the readout lines are arranged within an element area where the sensing pixels are formed;
wherein each of the control signals is configured to control a row of sensing pixels within the sensing pixel subset to output signals through corresponding readout lines.

10. The sensing device as claimed in claim 9, wherein the control signals include a first control signal and a second control signal, and the first control signal and the second control signal are configured to control a row of sensing pixels within different sensing pixel subsets to output signals through the corresponding readout lines in different time periods.

11. The sensing device as claimed in claim 9, wherein the number of output lines is equal to N.

12. The sensing device as claimed in claim 11, further comprising a processor configured to receive signals from the output lines.

13. The sensing device as claimed in claim 9, further comprising a plurality of buffer circuits coupled to the respective readout lines, wherein each of the control signals is coupled to a different buffer circuit subset of buffer circuits, and the buffer circuits within each of the buffer circuit subsets are adjacent to each other.

14. The sensing device as claimed in claim 9, wherein each of the sensing pixels includes a source follower, and each of the control signals is coupled to the respective source followers of the sensing pixels arranged in adjacent N columns.

15. The sensing device as claimed in claim 9, wherein the sensing device includes a biological feature-sensing device.

16. The sensing device as claimed in claim 15, wherein the biological feature-sensing device includes a fingerprint-sensing device.

17. The sensing device as claimed in claim 9, wherein each row of sensing pixels is controlled by an enable signal.

* * * * *